United States Patent Office 2,733,245
Patented Jan. 31, 1956

2,733,245

PROCESS FOR PRODUCTION OF HETERODIAZOLES

Cameron Ainsworth, Indianapolis, Ind., assignor to Eli Lilly and Company, Indianapolis, Ind., a corporation of Indiana No Drawing. Application April 12, 1954,
Serial No. 422,682

6 Claims. (Cl. 260—294.8)

This invention relates to a process for the production of substituted heterodiazoles and more particularly to the synthesis of substituted 1,3,4-oxadiazoles and 1,3,4-thiadiazoles.

I have found that a substituted heterodiazole is readily prepared in good yield by reacting an acid hydrazide with an ortho ester. The two reagents condense with the loss of an alcohol, and the heterodiazole is produced. The reaction whereby the heterodiazole is formed can be represented by the following equation

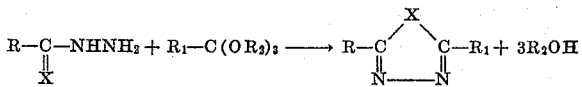

wherein R represents a radical which can be an aryl, substituted aryl or heterocyclic aromatic nucleus, which radical is inert with respect to an ortho ester; $R_1$ represents hydrogen or an alkyl radical; $R_2$ represents an alkyl radical; and X represents an oxygen or sulfur atom.

My new process is carried out by heating together the acid hydrazide and the ortho ester, preferably with the ester in excess. A solvent can be employed, and most conveniently the solvent is an excess of the ortho ester in which case about five to ten molecular equivalents of ortho ester are employed for each molecular equivalent of acid hydrazide. Numerous other solvents can also be employed, such including benzene, ethanol, tetralin, decalin, diphenyl ether, hexane and the like. The solvent, if one is employed, should, of course, be inert with respect to the reactants.

The temperature at which the reaction is carried out is not critical. Preferably the reaction is carried out at a temperature upwards of 80° C., and desirably upwards of 100° C. to insure the success of the condensation of acid hydrazide with ortho ester, and to provide a sufficiently rapid rate of condensation so that an excessively long reaction time is not required. Since both the reagents and the reaction products are comparatively heat stable, there is relatively little danger of excessive decomposition even when a reaction temperature as high as 200° C. is employed.

The recovery of the reaction product from the reaction mixture is effected by any of the commonly used means, i. e., by fractional distillation under reduced pressure, by recrystallization from a solvent or a mixture of solvents, etc., the mode of isolation depending to an extent upon whether the heterodiazole is a crystalline solid or an oil.

It will be seen from the above equation, that when an acid hydrazide of an oxygenated acid is employed in the reaction, a correspondingly substituted 1,3,4-oxadiazole will be produced, and analogously, when the acid hydrazide of a carbothionic acid is employed, a correspondingly substituted 1,3,4-thiadiazole will be obtained.

A wide variety of acid hydrazides derived from both aromatic carboxylic and carbothionic acids can be employed in my invention. It is essential only that the acid hydrazide does not contain a grouping or substitutent which is more reactive with an ortho ester than is the —NHNH$_2$ portion of the hydrazide molecule. Thus, for example, hydrazides such as p-aminobenzoic acid hydrazide and the hydrazide of alanine are unsuitable for use in my invention since the amino grouping present in each of the hydrazide molecules will react with the ortho ester and thus interfere excessively with the desired condensation process. Illustrative examples of hydrazides suitable for employment in my process are as follows: benzoic acid hydrazide, isonicotinic acid hydrazide, thionobenzoic acid hydrazide, o-methoxybenzoic acid hydrazide, p-chlorobenzoic acid hydrazide, p-nitrobenzoic acid hydrazide, picolinic acid hydrazide, nicotinic acid hydrazide, α-naphthoic acid hydrazide, terephthalic acid dihydrazide, quinaldinic acid hydrazide, p-nitrothionobenzoic acid hydrazide, p-methoxythionobenzoic acid hydrazide, and the like.

Numerous ortho esters can be employed in my new process, illustrative examples of which include: ethyl orthoformate, methyl orthoformate, ethyl orthoacetate, ethyl orthobutyrate, and the like. Additional examples of ortho esters suitable for the purpose of this invention will readily be apparent to the art. The ortho esters, like the hydrazides, should not contain highly reactive substituent groups which will react competitively with the hydrazide.

The following examples more specifically illustrate the process of the invention.

EXAMPLE 1

*Preparation of 2-phenyl-1,3,4-oxadiazole*

A mixture of 30 g. of benzoic acid hydrazide and 200 g. of ethyl orthoformate was gently boiled under reflux for a period of 15 hours. The reaction mixture was evaporated in vacuo on a steam bath to remove the excess ethyl orthoformate and the ethanol formed in the reaction, and the residue was fractionally distilled under reduced pressure. The 2-phenyl-1,3,4-oxadiazole formed in the reaction was obtained as a colorless oil boiling at about 125° C. at a pressure of 5 mm. of mercury. On standing, the 2-phenyl-1,3,4-oxadiazole solidified. The solid melted at about 34° C. A yield of about 30 g. of 2-phenyl-1,3,4-oxadiazole was obtained.

EXAMPLE 2

*Preparation of 2-ethyl-5-(4-pyridyl)-1,3,4-oxadiazole*

A mixture of 7 grams of isonicotinic acid hydrazide and 25 grams of ethyl orthopropionate was boiled under reflux for a period of about 15 hours. The excess ethyl orthopropionate was removed by evaporation in vacuo, and the residue was distilled under reduce pressure. The 2-ethyl-5-(4-pyridyl)-1,3,4-oxadiazole formed in the process boiled at about 130–140° C. at a pressure of 1 mm. of mercury. On cooling, the product solidified. After recrystallization from light petroleum ether, 2-ethyl-5-(4-pyridyl)-1,3,4-oxadiazole melted at about 50–52° C. A yield of 6.1 g. was obtained.

EXAMPLE 3

*Preparation of 2-phenyl-1,3,4-thiadiazole*

A mixture of 2 g. of thionobenzhydrazide and 10 g. of ethyl orthoformate was gently boiled under reflux for a period of about 24 hours. The excess ethyl orthoformate was then removed by evaporation in vacuo and the residue was distilled under reduced pressure. The 2-phenyl-1,3,4-thiadiazole formed in the process boiled at about 115° C. at a pressure of 0.1 mm. of mercury. On standing, the material solidified, and then had melting point of about 40° C. About 1 gram of the product was recovered.

EXAMPLE 4

The following table sets forth the results obtained by carrying out my process in the manner set forth in the foregoing examples, but using acid hydrazides represented by the formula $$R-\underset{\underset{O}{\|}}{C}-NHNH_2$$

and ortho esters represented by the formula $$R_1-C(OC_2H_5)_3$$

R, $R_1$ and X having the significance as set forth in the table.

| R | X | $R_1$ | Product | M. P., °C. | Yield, Percent |
|---|---|---|---|---|---|
| o-methoxyphenyl | O | H | 2-(o-methoxyphenyl)-1,3,4-oxadiazole. | 47-49 | 80 |
| p-chlorophenyl | O | H | 2-(p-chlorophenyl)-1,3,4-oxadiazole. | 134 | 78 |
| p-nitrophenyl | O | H | 2-(p-nitrophenyl)-1,3,4-oxadiazole. | 156-157 | 78 |
| 4-pyridyl | O | H | 2-(4-pyridyl)-1,3,4-oxadiazole | 120-121 | 82 |
| 3-pyridyl | O | H | 2-(3-pyridyl)-1,3,4-oxadiazole | 75 | 68 |
| 2-pyridyl | O | H | 2-(2-pyridyl)-1,3,4-oxadiazole | 115 | 60 |
| α-naphthyl | O | H | 2-(α-naphthyl)-1,3,4-oxadiazole | 65 | 63 |
| phenyl | O | $CH_3$ | 2-phenyl-5-methyl-1,3,4-oxadiazole. | 67 | 68 |
| phenyl | O | $C_2H_5$ | 2-phenyl-5-ethyl-1,3,4-oxadiazole. | B. P. 105/0.1 mm. Hg | 81 |
| o-methoxyphenyl | O | $C_2H_5$ | 2-(o-methoxyphenyl)-5-ethyl-1,3,4-oxadiazole. | B. P. 135/0.05 mm. Hg | 78 |
| p-chlorophenyl | O | $C_2H_5$ | 2-(p-chlorophenyl)-5-ethyl-1,3,4-oxadiazole. | 93 | 87 |
| p-nitrophenyl | O | $C_2H_5$ | 2-(p-nitrophenyl)-5-ethyl-1,3,4-oxadiazole. | 133-134 | 91 |
| α-naphthyl | O | $C_2H_5$ | 2-(α-naphthyl)-5-ethyl-1,3,4-oxadiazole. | B. P. 160/0.1 mm. Hg | 80 |
| 4-pyridyl | O | $C_2H_5$ | 2-(4-pyridyl)-5-ethyl-1,3,4-oxadiazole. | 50-52 | 70 |
| p-$CONHNH_2$-phenyl | O | H | p-phenylene-bis-[2-(1,3,4-oxadiazole)]. | 275 | 92 |
| phenyl | S | $CH_3$ | 2-phenyl-5-methyl-1,3,4-thiadiazole. | 103-105 | 35 |

1-phenyl-1,3,4-oxadiazole and 1-phenyl-1,3,4-thiadiazole which are especially useful because of their physiological action as hypnotics are disclosed and claimed in my co-pending application Serial Number 422,681 filed on even date herewith, now Patent No. 2,702,803.

I claim:
1. A process for the preparation of heterodiazoles, which comprises heating an acid hydrazide having the formula

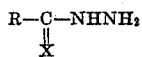

wherein R represents a radical of the group consisting of aryl, substituted aryl, and heterocyclic aromatic which radical is chemically inert to the action of ortho esters, and X represents a member of the group consisting of oxygen and sulfur atoms, with an ortho ester represented by the formula $$R_1—C(OR_2)_3$$

wherein $R_1$ represents a member of the group consisting of hydrogen and alkyl radicals and $R_2$ represents an alkyl radical.

2. The process for the preparation of 1,3,4-thiadiazoles, which comprises heating an acid hydrazide represented by the formula

wherein Ar represents a monocarbocyclic aromatic radical which radical is chemically inert to the action of ortho esters, with an ortho ester represented by the formula Alk—C—(O—Alk)₃ wherein Alk represents an alkyl radical having from 1 to 8 carbon atoms.

3. The process for the preparation of 1,3,4-oxadiazoles, which comprises heating an acid hydrazide represented by the formula

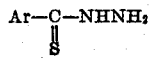

wherein Ar represents a monocarbocyclic aromatic radical which radical is chemically inert to the action of ortho esters, with an ortho ester represented by the formula

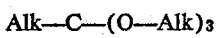

wherein Alk represents an alkyl radical having from 1 to 8 carbon atoms.

4. The process for the preparation of heterodiazoles having the formula

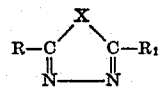

wherein R represents a radical of the group consisting of aryl, substituted aryl and heterocyclic aromatic which radical is chemically inert to the action of ortho esters, $R_1$ represents a member of the group consisting of hydrogen and alkyl radicals, and X represents a member of the group consisting of oxygen and sulfur atoms; which comprises heating an R- and X-substituted acid hydrazide with an $R_1$-substituted ortho ester, R, $R_1$ and X having the same significance as above.

5. The process for the preparation of 1,3,4-thiadiazoles, which comprises heating an acid hydrazide represented by the formula

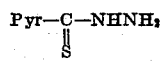

wherein Pyr is a pyridyl radical which radical is inert to the action of ortho esters, with an ortho ester represented by the formula

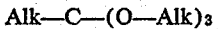

wherein Alk represents an alkyl radical having from 1 to 8 carbon atoms.

6. The process for the preparation of 1,3,4-oxadiazoles, which comprises heating an acid hydrazide represented by the formula

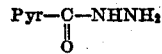

wherein Pyr is a pyridyl radical which radical is inert to the action of ortho esters, with an ortho ester represented by the formula

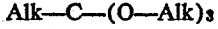

wherein Alk represents an alkyl radical having from 1 to 8 carbon atoms.

References Cited in the file of this patent

Bambas: "The Chem. of Heterocyclic Comp'ds" (Interscience), pp. 81–84 (1952).